United States Patent
Gong et al.

(10) Patent No.: US 6,683,737 B2
(45) Date of Patent: Jan. 27, 2004

(54) METHOD AND APPARATUS FOR PREDICTIVE FAILURE ANALYSIS TECHNIQUE FOR HEAD CRASHES IN HARD DRIVES USING POSITION ERROR SIGNAL

(75) Inventors: Karl Gong, San Jose, CA (US); Hal Hjalmar Ottesen, Rochester, MN (US); Gordon James Smith, Rochester, MN (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 378 days.

(21) Appl. No.: 09/909,294

(22) Filed: Jul. 19, 2001

(65) Prior Publication Data

US 2003/0016462 A1 Jan. 23, 2003

(51) Int. Cl.[7] .................... G11B 27/36; G11B 21/02
(52) U.S. Cl. ................ 360/31; 360/75; 360/77.02; 318/560
(58) Field of Search .................. 360/75, 31, 77.02, 360/77.05, 77.08, 69; 318/560, 561

(56) References Cited

U.S. PATENT DOCUMENTS 6,414,809 B1 * 7/2002 Sakai et al. .............. 360/60
6,429,996 B1 * 8/2002 Iwashiro ................ 360/78.07

* cited by examiner

*Primary Examiner*—David Hudspeth
*Assistant Examiner*—Dan I. Davidson
(74) *Attorney, Agent, or Firm*—James R. Nock; Bracewell & Patterson, L.L.P.

(57) ABSTRACT

A position error signal indicative of the distance between an expected position of a magnetic head relative to the track centerline of a magnetic data storage and retrieval system and an actual position of the magnetic head relative to the track centerline is detected. An absolute value of the position error signal is determined and stored. The detection, determination, and storage is repeated over several revolutions of the magnetic data storage and retrieval system. A maximum of the absolute values of the position error signals is then determined and compared to a threshold value. If the maximum of the absolute values of the position error signals exceeds the threshold value, a warning signal is propagated. An alternative embodiment similarly predicts the possibility of head-disk crash on the basis of the maximum value of several samples of the squares of the position error signals.

14 Claims, 9 Drawing Sheets

METHOD AND APPARATUS FOR PREDICTIVE FAILURE ANALYSIS TECHNIQUE FOR HEAD CRASHES IN HARD DRIVES USING POSITION ERROR SIGNAL

BACKGROUND OF THE INVENTION

1. Technical Field

The present invention relates in general to magnetic data storage and retrieval systems and in particular to methods and apparatus for predicting head-disk interactions in magnetic disk storage and retrieval systems. Still more particularly, the present invention relates to an improved method and apparatus for predicting head-disk interactions (e.g. head crashes) in magnetic disk storage and retrieval systems on the basis of sway mode frequency presence in a position error signal.

2. Description of the Related Art

Generally, a data access and storage system consists of one or more storage devices that store data on magnetic or optical storage media. For example, a magnetic data storage and retrieval system is known as a direct access storage device (DASD) or a hard disk drive (HDD) and includes one or more disks and a disk controller to manage local operations concerning the disks. The disks themselves in a hard disk drive (HDD) are usually made of aluminum alloy or a mixture of glass and ceramic, and are covered with a magnetic coating. Typically, two or more disks are stacked vertically on a common spindle that is turned by a disk drive motor at several thousand revolutions per minute (rpm).

The only other moving part within a typical magnetic data storage and retrieval system is the actuator assembly. Within most magnetic data storage and retrieval systems, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) that enables the slider to fly at a constant height close to the disk during operation of the disk drive. A slider is associated with each side of each disk platter and flies just over the platter's surface. Each slider is mounted on a suspension to form a head gimbal assembly (HGA). The HGA is then attached to a flexible suspension, which is attached to a rigid arm. Several arms are ganged together to form a head/suspension/arm assembly.

Each read/write head scans the surface of a disk during a "read" or "write" operation. The head/suspension/arm assembly is moved utilizing an actuator that is often a voice coil motor (VCM). The stator of a VCM is mounted to a base plate or casting on which the spindle is also mounted. The base casting is in turn mounted to a frame via a compliant suspension. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

In normal operation, the slider and head fly over the surface of the disk at a vertical height on the order of 2 millionths of an inch. The microscopic distance between the recording surface and the read/write head leaves little tolerance for vertical misalignment. Even very small angular misalignments of components resulting from wear, mismanufacture, or foreign objects on the surface of the disk can cause the head to come in contact with the recording surface. Such physical contact may cause the slider to "fishtail" temporarily in the plane of the disk surface. Repeated physical contacts in the same location on the disk surface may lead to a head-disk crash. This renders the disk inoperable and destroys any data stored on the recording surface.

Computer users have traditionally, if bitterly, accepted as inevitable the random loss of data due to a head-disk crash. Frequent backups limit the magnitude of data loss, but no convenient and cost-effective solution exists for entirely preventing the loss of data. Greater backup frequency reduces the magnitude of the loss but increases the magnitude of the inconvenience to the user. Redundant storage solutions reduce data loss but degrade system performance and increase system cost. Users have long desired, and industry has unsuccessfully attempted to produce, a warning that would inform users of an impending head-disk crash. With a proper warning of an impending head-disk crash, users could perform an immediate backup of desired data and thereby completely eliminate data loss from head-disk crash events.

SUMMARY OF THE INVENTION

It is therefore one object of the present invention to provide a method and apparatus for improved warning of head-disk crash in magnetic data storage and retrieval systems.

It is another object of the present invention to provide a method and apparatus for predicting head-disk crash events in magnetic data storage and retrieval systems.

It is yet another object of the present invention to provide a method and apparatus for predicting head-disk crash in magnetic data storage and retrieval systems on the basis of sway mode or fishtailing frequency behavior in a position error signal.

The foregoing objects are achieved as is now described. A position error signal (PES), indicative of the distance between an expected radial position of a magnetic head relative to a particular track centerline of a magnetic data storage and retrieval system and an actual position of the magnetic head relative to the recording surface, is detected and filtered. The signal is bandpass filtered to generate a sway mode (fishtailing) signal indicative of an oscillation of the actual position of the magnetic head relative to the track centerline. The absolute value of the sway mode signal is then determined. If the absolute value of the sway mode signal exceeds a predicted threshold value that correlates to a high probability of an impending head-disk crash, a warning signal is propagated. Alternative embodiments similarly predict the possibility of head-disk crash on the basis of the maximum value of several samples of the position error signal and on the basis of the maximum value of several samples of the square of the position error signal.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
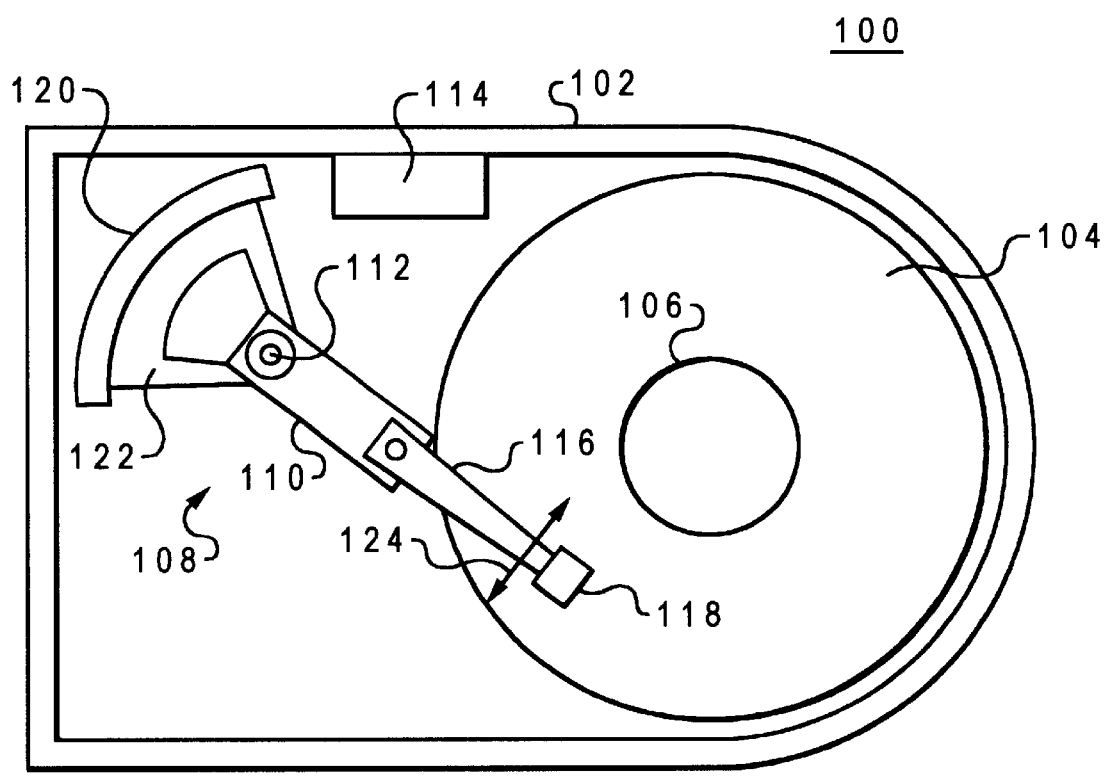
FIG. 1 depicts a schematic drawing of one embodiment of a magnetic data storage and retrieval system for a data processing system, in which a preferred embodiment of the present invention may be implemented.

With reference now to the figures, and in particular with reference to FIG. 1, a schematic drawing of one embodiment of a magnetic data storage and retrieval system for a data processing system, in which a preferred embodiment of the present invention may be implemented, is illustrated. The magnetic data storage and retrieval system 100 has an outer casting, housing or base 102 containing a plurality of stacked, parallel magnetic disks 104 (one shown), which are closely spaced apart. Disks 104 are rotated by a spindle motor located there below about a central drive hub 106. An actuator 108 comprises a plurality of stacked, parallel actuator arms 110 (one shown) in the form of a comb that is pivotally mounted to the base 102 about a pivot assembly 112. A controller 114 is also mounted to the base 102 for selectively moving the comb of arms 110 relative to disks 104. The controller 114 monitors and provides command inputs to the actuator 108.

In the embodiment shown, each arm 110 has extending from it a pair of parallel, cantilevered load beams or suspensions 116 (one shown), and at least one magnetic read/write transducer or head 118 mounted on a slider secured to a flexure that is flexibly mounted to each suspension 116. The read/write heads 118 magnetically read data from and/or magnetically write data to the disks 104. The level of integration called a head gimbal assembly comprises a head 118 mounted on a suspension 116. Suspensions 116 have a spring-like quality which biases or maintains them in parallel relationship relative to one another. A voice coil motor 120 housed within a conventional voice coil motor magnet assembly (not shown) is also mounted to the arms 110 opposite head gimbal assemblies 116. Movement of an actuator coil assembly 122 (indicated by arrow 124) moves the head gimbal assemblies 116 substantially radially across tracks on the disks 104 until the heads on assemblies 118 settle on the target tracks. The head gimbal assemblies 116 operate in a conventional manner and always move in unison with one another, unless the hard drive 100 uses a split actuator (not shown) wherein the arms move independently of one another.

The controller 114 will typically include a closed-loop actuator servo control system for positioning the actuator and the read/write transducers to specified storage track locations on the data storage disk. During normal data storage system operation, a servo transducer, generally mounted proximate to the read/write transducers in the head 118, or, alternatively, incorporated as part of the read element of the transducer in the head, is typically employed to read information for the purpose of following a specified track (track following) and seeking specified track and data sector locations on the disk (track seeking).

Figure 2A:
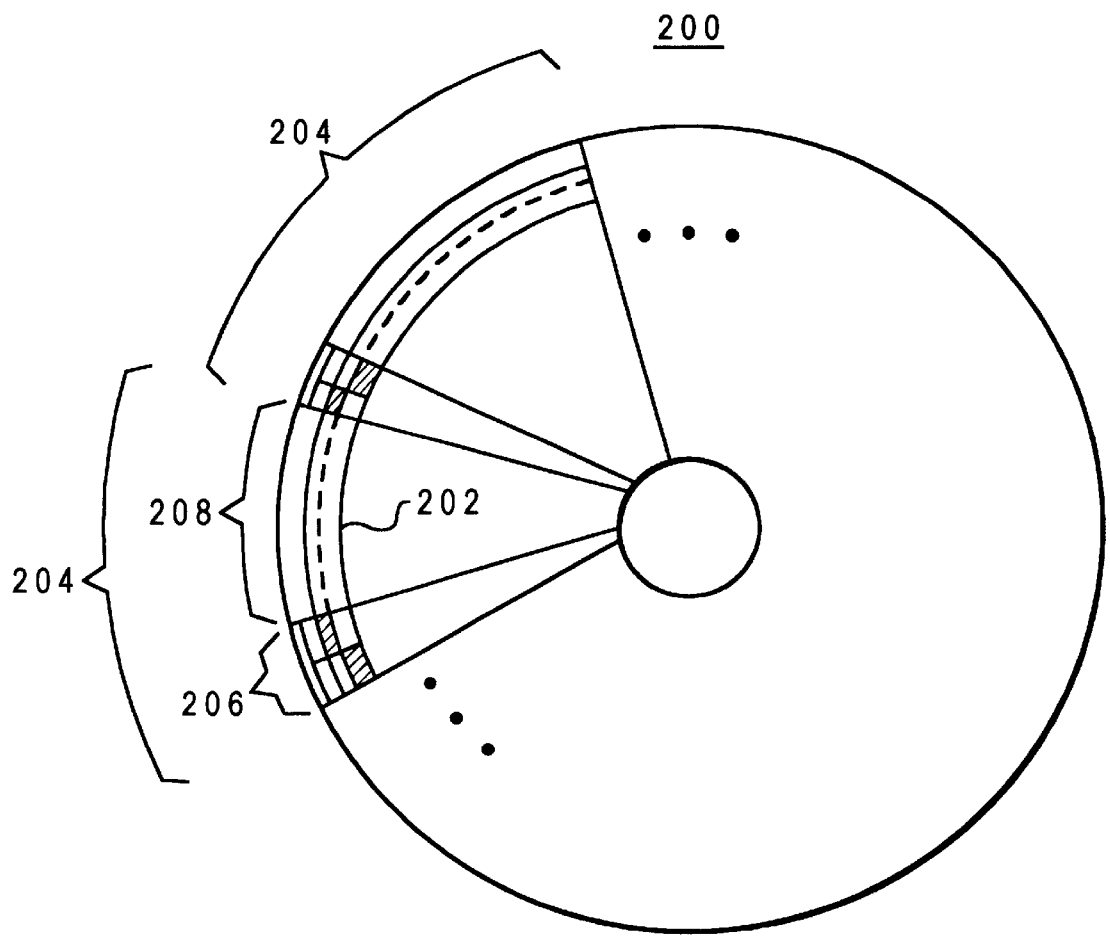
FIG. 2A is a simplified top view of an exemplary data storage disk in accordance with a preferred embodiment of the present invention.

With reference to FIG. 2A, a simplified top view of an exemplary data storage disk in accordance with a preferred embodiment of the present invention is depicted. Details of an exemplary servo control technique will be described with reference to this exemplary data storage disk. The exemplary servo technique and disk are illustrated for purposes of example and not of limitation; a number of servo control techniques and disks used therein are covered by the present invention. As shown in FIG. 2A, the exemplary disk 200 generally includes a number of concentric tracks 202 which are generally divided into a plurality of sectors 204. Each of the sectors 204 generally includes a servo information field 206 and a data field 208. Each servo information field 206 may consist of a number of subfields including, for example, a synchronization field, a Gray code field and a servo pattern field. For ease of illustration, only a servo pattern field is shown herein. In general, the servo information fields 206 induce readback signals in a read head. The readback signals are then demodulated to generate a position error signal (PES signal) which can, for example, be used to position the read transducer at the centerline of a desired track 202.

A servo track writing procedure will typically be implemented to initially record servo pattern information 206 on the surface of one or more of the data storage disks 300. A servo track writer (STW) assembly (not shown) is typically used by manufacturers of data storage systems to facilitate the transfer of servo pattern data 206 to one or more data storage disks 200 during the manufacturing process.

In accordance with one known STW technique, embedded servo information fields 206 are written to the disk along segments extending in a direction generally outward from the center of the disk to embed a servo pattern. The embedded servo pattern is thus formed between the data fields 208 of each track. It is noted that a servo information field 206 typically contains a pattern of data, often termed a servo burst pattern, used to generate a position error signal (PES) to maintain optimum alignment of the read/write transducers over the centerline of a track when reading and writing data to specified sectors 208 on the track. The servo information field 206 may also include sector and track identification codes which are used to identify the coarse position of the transducer.

The servo burst pattern typically induces signals in the read element (readback signals) of the head 118 which are used to develop a position error signal (PES). The PES is used to maintain the transducer in the head 118 over the centerline of the track 202.

Figure 2B:
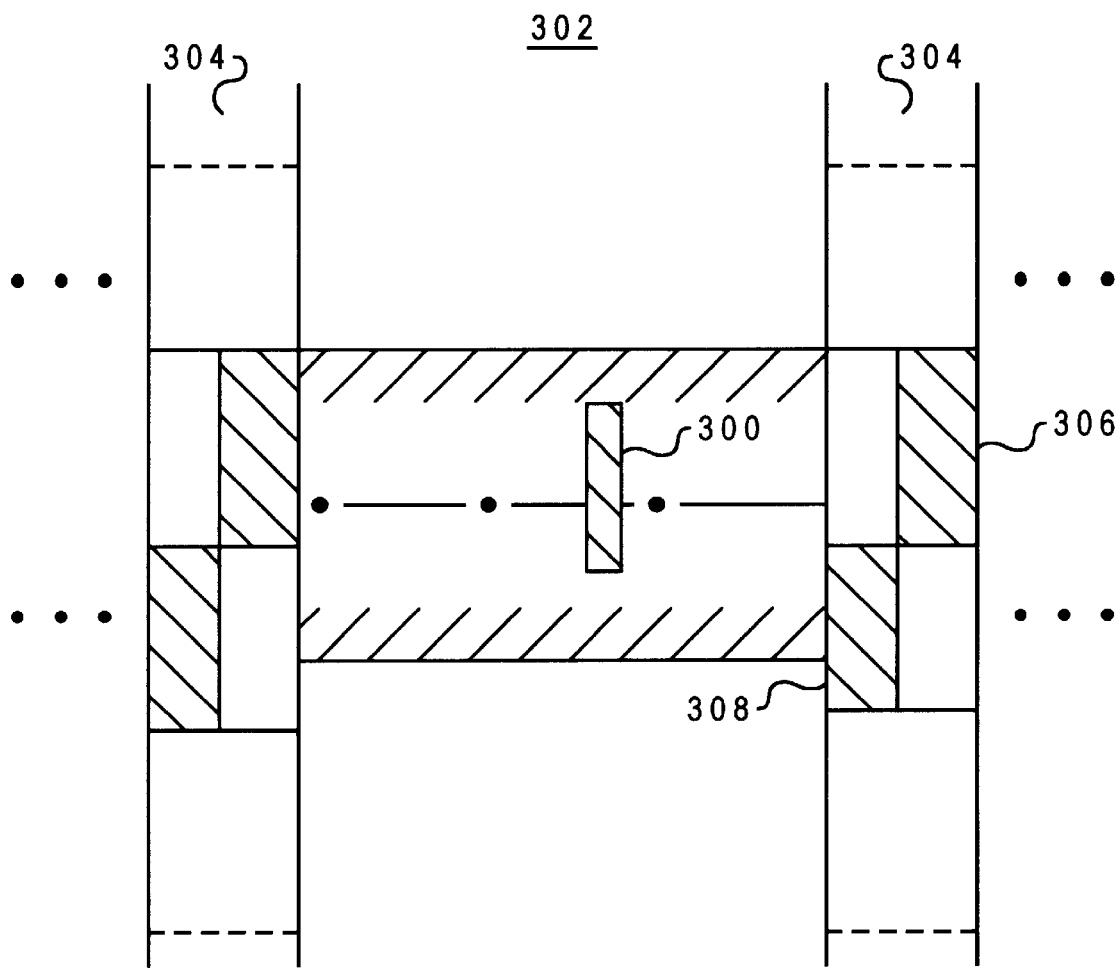
FIG. 2B depicts a simplified view of a small section of an exemplary data storage disk in accordance with a preferred embodiment of the present invention.

With reference to FIG. 2B, a simplified view of a small section of an exemplary data storage disk in accordance with a preferred embodiment of the present invention is illustrated. FIG. 2B illustrates a read head 200 flying over an enlarged portion 202 of a data storage disk 200. The disk portion 202 generally includes a servo information field 204, at least a portion of which is divided into servo patterns. While the invention is not so limited, two patterns, an A field pattern 206 and a B field pattern 208, are provided in the illustrated embodiment. The A and B servo field patterns 206 and 208 are read by the read head 200 and the induced readback signals are demodulated and used for positioning the read heads. As each read head passes over the servo information field 204, two readback signals $e_a$ and $e_b$ are induced by servo pattern A 206 and servo pattern B 208, respectively. The induced readback signals $e_a$ and $e_b$ are then demodulated to develop a position error signal (PES), for example, according to the relationship: $PES=(e_b-e_a)/(e_b+e_a)$. The PES signal is provided to the servo controller 114, which in conventional systems moves the read head 118 to maintain the PES signal equal to zero during track following. A more detailed discussion of servo information patterns and servo control systems may be found in Narita et al., U.S. Pat. No. 5,426,544, entitled "Sensitivity Correcting Circuit Of Servo Signal Detection On Data Surface And Offset Measuring Circuit And Magnetic Disk Unit," and Suzuki, U.S. Pat. No. 5,457,587, entitled "Method And System For Correcting Offset Of Head Position Signal," both of which are herein incorporated by reference.

Figure 3:
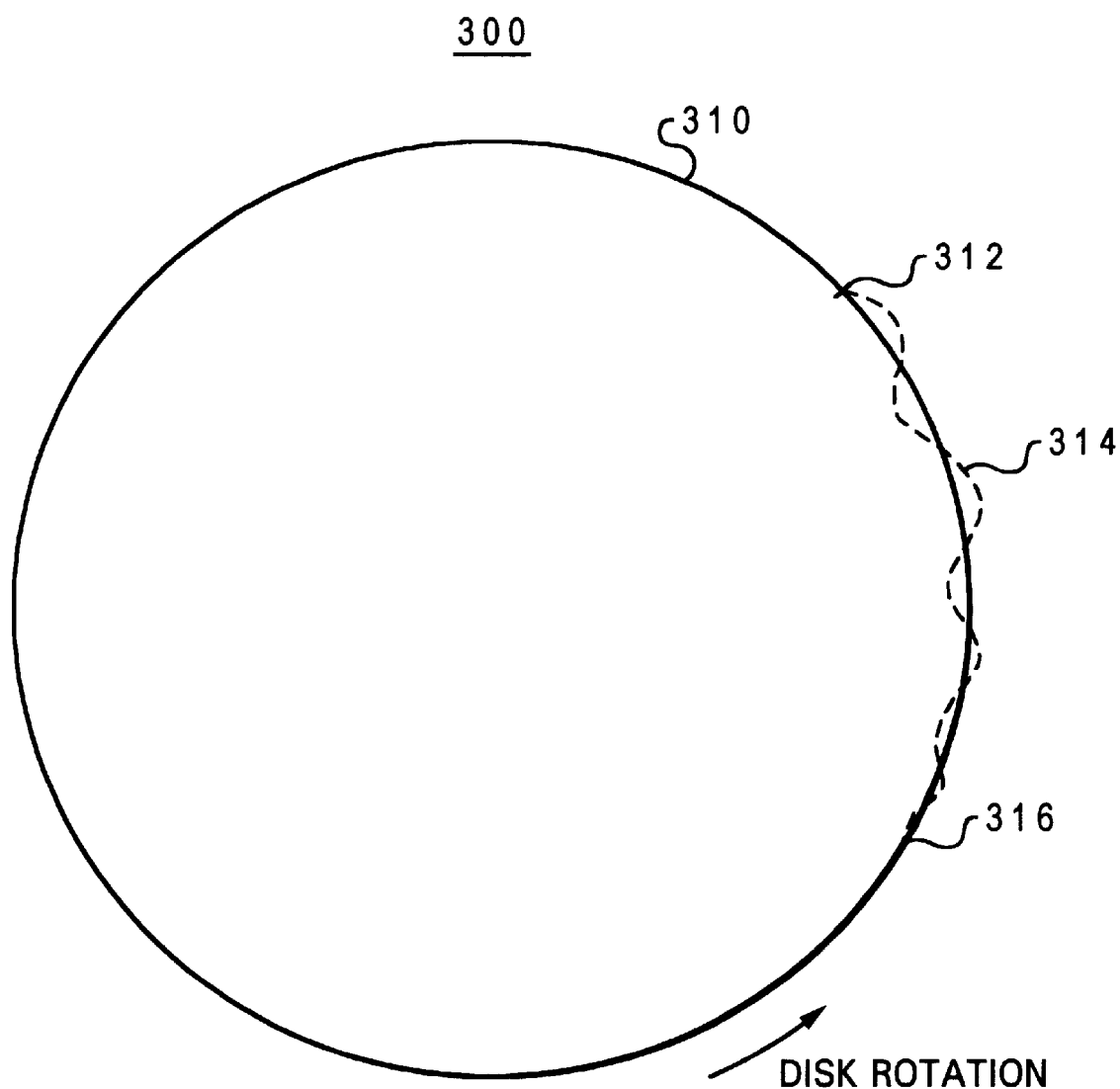
FIG. 3 illustrates the fishtailing of a slider caused by a physical contact between the slider and the disk surface, while the disk drive is in a track-following mode.

FIG. 3 depicts an isolated track 310 on a disk surface 300 of a hard disk drive 100. The disk surface is rotated in the counterclockwise direction and the head/slider 118 is following the center line of the track 310. A physical head-disk contact is made at point 312 causing the slider to move from side to side in a damped fashion in the plane of the disk surface. This is often referred to as the slider being in a fishtail mode or a swaying mode. A footprint 314 of the head centerline relative to the centerline of the track 310 is shown as the dashed line in FIG. 3. The fishtail mode event of the head 118 is temporary; it starts at the point 312 on the track 310 and ends at a point 316 on the track 310. The duration of the fishtailing event depends on the severity of the head-disk impact and may last for several revolutions of the disk. The fact that this fishtailing motion is in the plane of the disk surface allows its detection in the position error signal (PES).

Figure 4:
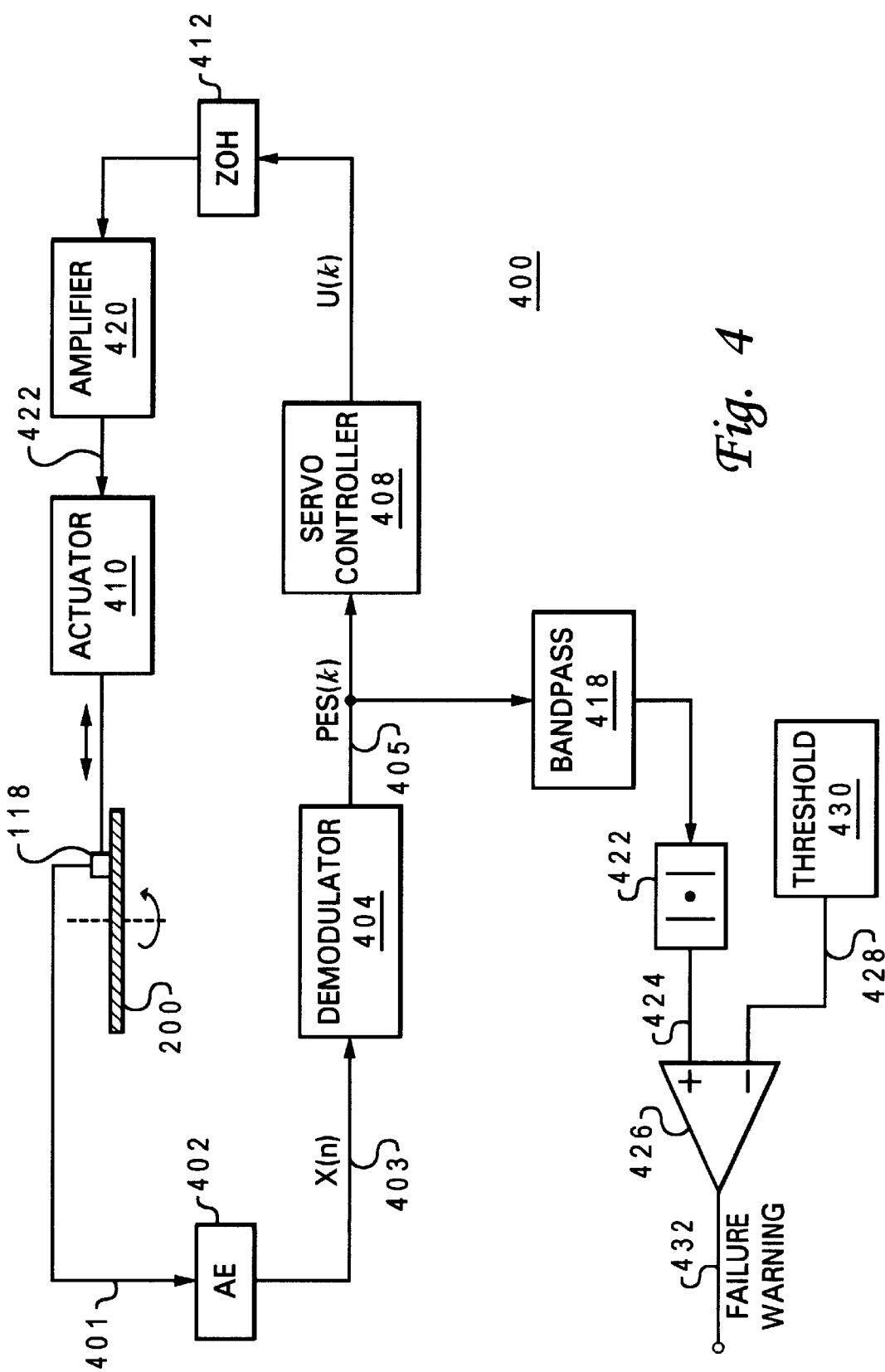
FIG. 4 is a high-level schematic of a control circuit for magnetic data storage and retrieval system in accordance with a preferred embodiment of the present invention.

With reference to FIG. 4, a high-level schematic of the control circuit for magnetic data storage and retrieval system in accordance with a preferred embodiment of the present invention is depicted. The control circuit 400 includes an arm-electronics (AE) module 402 receiving a readback signal from the head 118 on a line 401. The output signal of the AE module 402 is sampled (sampler not shown) and the sampled signal x(n) is presented to a demodulator 404 on a line 403. The demodulator 404 produces a position error signal, PES(k), where k is the servo index corresponding to one of the servo fields 206 in FIG. 2A. The PES(k) signal on a line 405 is fed into a servo controller 408 that provides a control output U(k) relative to its input PES(k). The servo controller 408 contains a servo control algorithm and may also have one or more notch filters to filter out mechanical resonance frequencies present in the control output U(k).

The digital control output U(k) is converted to an analog signal in a Zero Order Hold (ZOH) 412 whose output is amplified by an amplifier 420. The amplifier 420 provides a signal on a line 422 to an actuator 410, which is typically a voice motor (VCM). The actuator 410 repositions the head/suspension/arm assembly to more perfectly align the head 118 to the centerline of the track 310 on the surface 300 of the disk 200. This description completes the closed actuator servo-loop in FIG. 4.

Also shown in FIG. 4 is the sway mode or fishtail mode detection apparatus. The position error signal PES(k) on the line 405 is filtered by a programmable bandpass filter 418 tuned to accept the sway-mode frequencies for a given type of slider/suspension assembly. The filtered output from the bandpass filter 418 is rectified and smoothed by a rectifier 422. The output of the rectifier 422 is called a sway mode signal 424 and indicates an oscillation of the actual position of the magnetic head 118 relative to the centerline of the recorded track 310. The sway mode frequency is an empirically determined frequency at which, if oscillations of the actual position of the magnetic head relative to the recording surface in the selected frequency range are present, a head-disk interaction is likely. The sway mode signal 424 then propagates to a comparison module 426, which compares the sway mode signal 424 to a reference signal 428 that is stored in a threshold module 430. If the comparison module 426 determines that the strength of the sway mode signal exceeds the strength of the reference signal 428, then a failure warning 432 is generated and sent outside the circuit.

Figure 5:
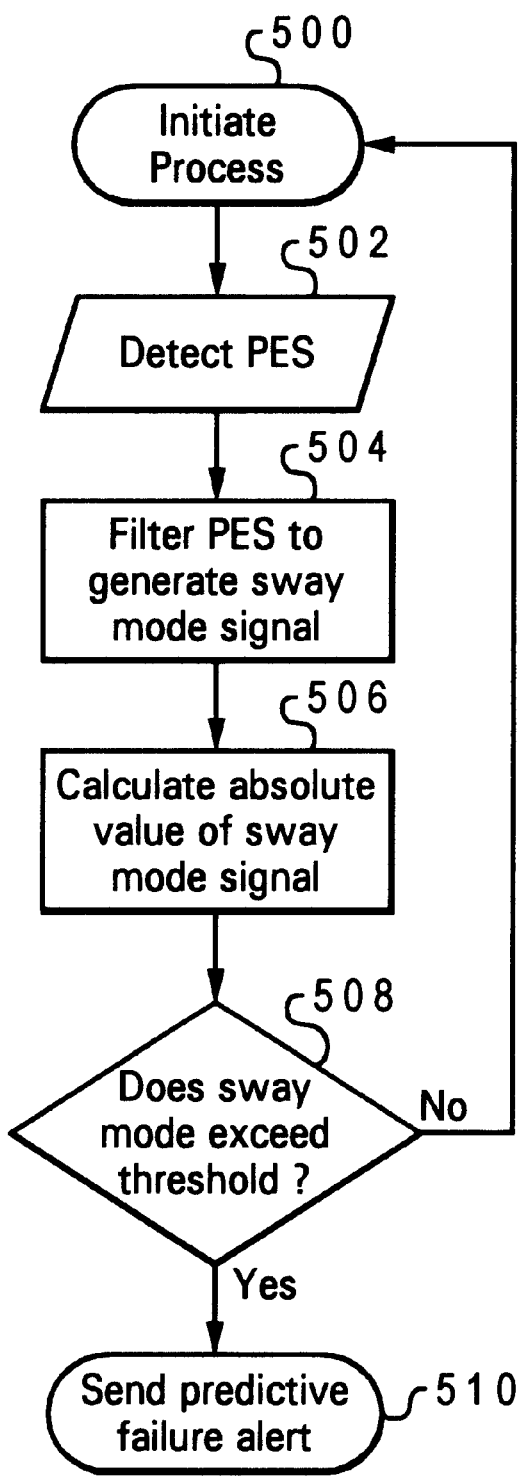
FIG. 5 depicts a high-level flowchart for the process of predicting and warning of an impending head-disk crash in accordance with a preferred embodiment of the present invention.

With reference to FIG. 5, a high-level flowchart for the process of predicting and warning of an impending head-disk crash in accordance with a preferred embodiment of the present invention is illustrated. The process begins at step 500, which depicts an initiation sequence. In some embodiments of the invention, the initiation sequence will involve waiting for the hard drive to enter its idle time function, or the process may be triggered by other system events ranging from an internal timing trigger to manual input from a user of the system. After the process has been triggered and the initiation sequence portrayed in step 500 has run, the process then passes to step 502, which illustrates the detection of a position error signal indicative of the distance between an expected position of a magnetic head relative to a track centerline and an actual position of the magnetic head relative to the track centerline. The process next passes to step 504, which depicts the bandpass filtering of the position error signal to generate a sway mode signal indicative of an oscillation of the actual position of the magnetic head relative to the track centerline in a selected frequency range.

This embodiment of the invention functions on the basis of an observed correlation between the presence of oscillations of the position error signal in a selected frequency range and the occurrence of disk-head contact. For magnetic data storage and retrieval systems, there exists a unique selected frequency or discrete range of selected frequencies wherein, if the position error signal oscillates substantially in that selected frequency range, a high likelihood of head-disk crash exists. The presence of oscillations in the empirically derived selected frequency range serves as a precursor to magnetic data storage and retrieval system failure, and the filtering step 504, serves to isolate for further examination the oscillations of the position error signal in that selected frequency range.

The process next passes to step 506, which illustrates determining an absolute value of the sway mode signal, and then passes to step 508, which depicts determining whether the absolute value of the sway mode signal exceeds a threshold value. Though some oscillations in the selected frequency range may exist at all times, the correlation between the oscillations of the position error signal in the selected frequency range and the likelihood of a head-disk crash increases with the absolute value of the position error signal in the selected frequency range, and the threshold value to which the determining step compares the absolute value of the position error signal in the selected frequency range represents a point at which the absolute value of the position error signal in the selected frequency range correlates to a high likelihood of head-disk crash. Once the selected frequency range for a particular drive or family of drives has been determined through testing, it may be stored in a programable filter. A non-programmable filter may also be used during production if the selected frequency range is already known at the time of manufacture.

If the absolute value of the sway mode signal exceeds the threshold value, the process next passes to step 510, which illustrates propagating a warning signal. This warning signal, a predictive failure analysis warning, informs the system of the likelihood of a head-disk crash. Once this signal is activated, the system can then take automatic measures to prevent data loss or can prompt the user with a predictive failure warning and instruct the user to take measures to protect the user's data. Measures that may be taken manually or automatically include performing a backup of the magnetic data storage and retrieval system in question, discontinuing access to the disk and shutting down the disk, or shutting down the data processing system in which the magnetic data storage and retrieval system operates. The appropriate data loss prevention measures will vary on the basis of the operational requirements and environment of the data processing system to which the magnetic data storage and retrieval system is attached. If the absolute value of the sway mode signal does not exceed the threshold value, the process next passes to step 500, which depicts an initiation sequence. In some embodiments of the invention, the initiation sequence will involve waiting for the hard drive to enter its idle time function, or the process may be triggered by other system events ranging from an internal timing trigger to manual input from a user of the system.

Figure 6:
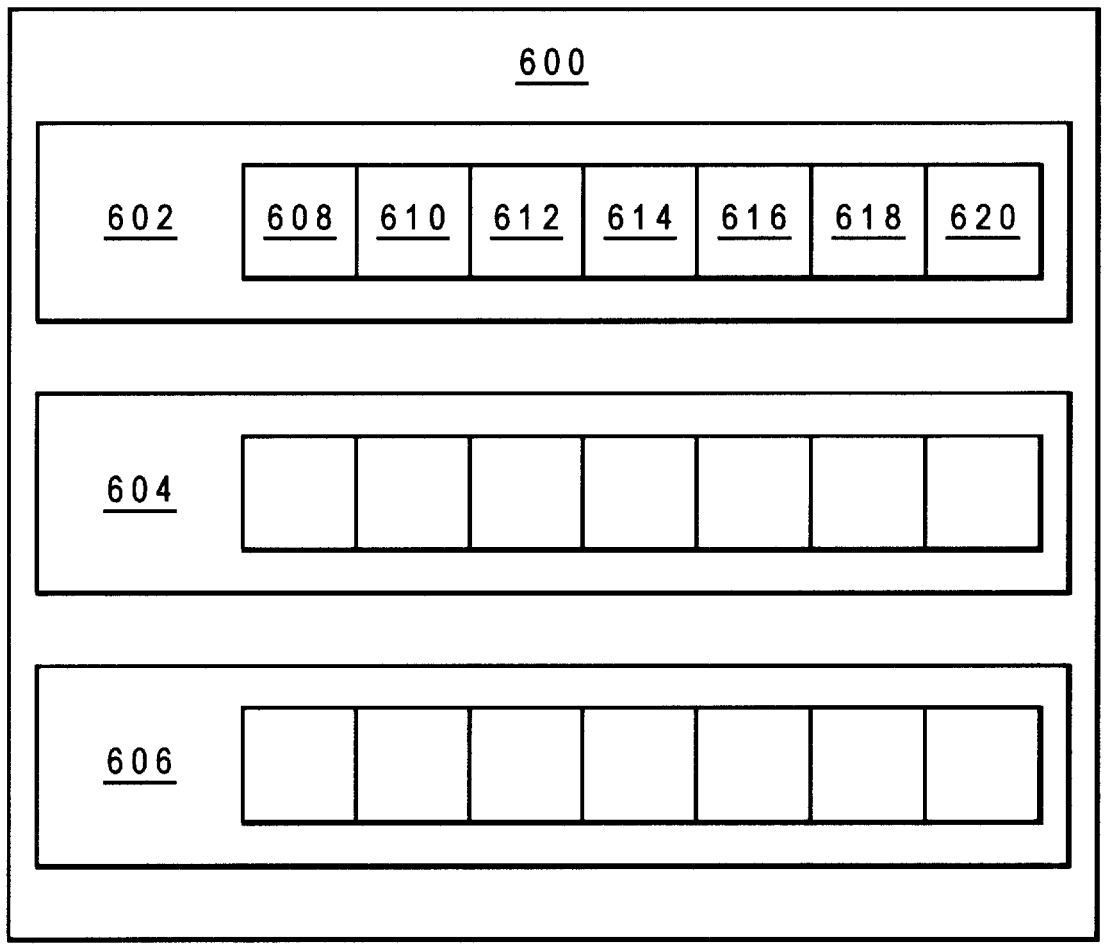
FIG. 6 is a high-level schematic of a data storage structure in accordance with an alternative embodiment of the present invention.

With reference to FIG. 6, a high-level schematic of a data storage structure in accordance with an alternative embodiment of the present invention is depicted. The data storage structure 600 includes several storage levels 602–606, each of which contains several data points 608–620. The alternative embodiments of the present invention will typically employ the data storage structure 600 to store samples of the absolute value or the square of the position error signal as data points 608–620. Those samples of the absolute value or the square of the position error signal (PES) will typically be written to the data points 608–620 of one or more storage levels 602–606 for a given length of time and then read from the data points 608–620 of one or more storage levels 602–606. The maximum of the data points 608–620 will then typically be determined from the PES values read. Though the data storage structure 600 described herein contains only three storage levels 602–606 and each storage level 602–606 contains seven data points 608–620, the number of storage levels 602–606 and data points 608–620 will vary on the basis of the design requirements of a particular embodiment, and the design shown here is merely illustrative of a typical example.

Figure 7:
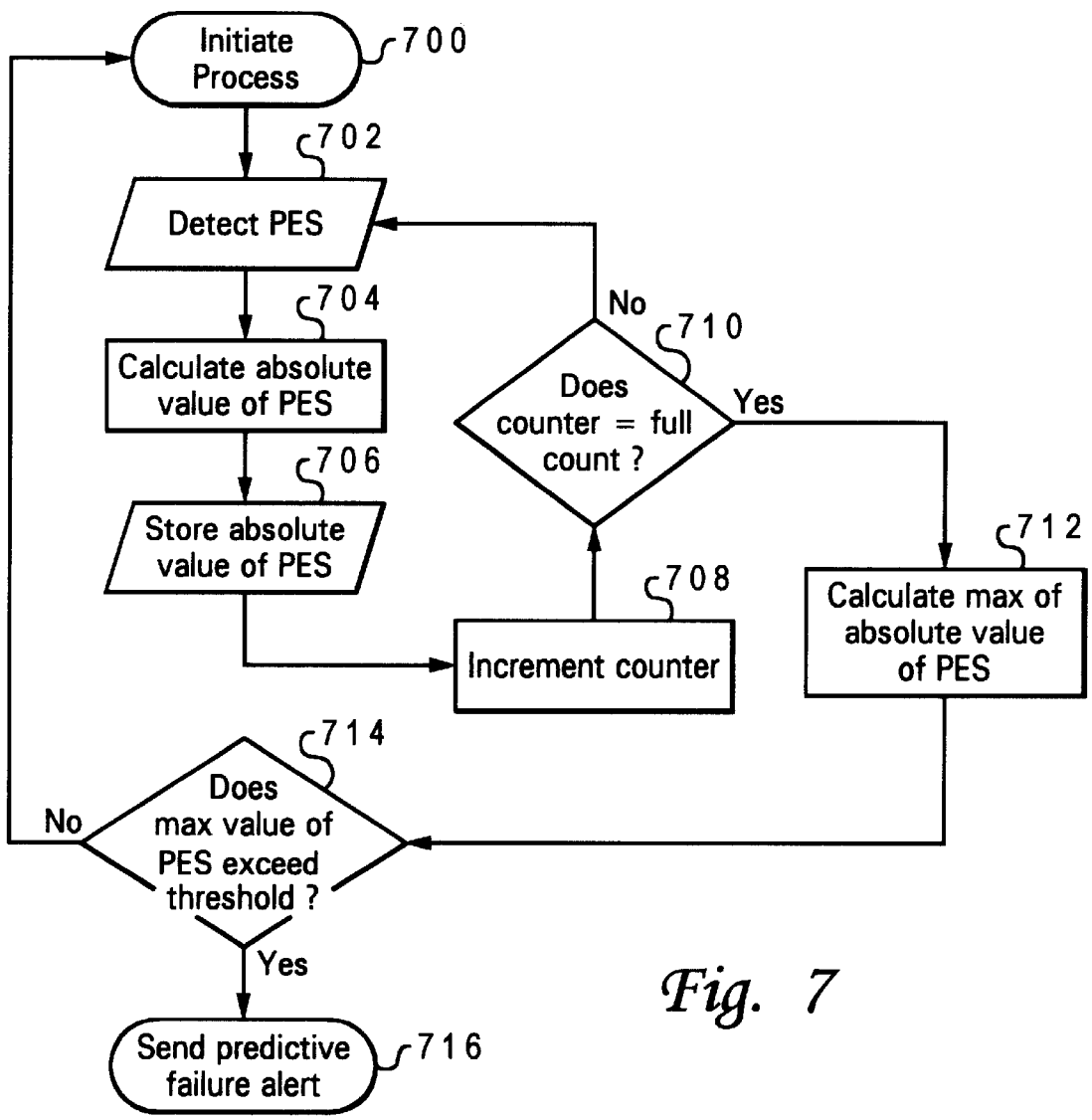
FIG. 7 depicts a high-level flowchart for a process of predicting and warning of an impending head-disk crash on the basis of the absolute value of the position error signal in accordance with a first alternative embodiment of the present invention.

With reference to FIG. 7, a high-level flowchart for a process of predicting and warning of an impending head-disk crash on the basis of the absolute value of the position error signal (PES) in accordance with a first alternative embodiment of the present invention is illustrated. The process begins at step 700, which depicts an initiation sequence. In some embodiments of the invention, the initiation sequence will involve waiting for the hard drive to enter its idle time function, or the process may be triggered by other system events ranging from an internal timing trigger to manual input from a user of the system. After the process has been triggered and the initiation sequence portrayed in step 700 has run, the process then passes to step 702, which illustrates the detection of a position error signal indicative of the distance between an expected position of a magnetic head relative to the track centerline and an actual position of the magnetic head relative to the track centerline. The process next passes to step 704, which depicts determining an absolute value of the position error signal.

This embodiment of the invention functions on the basis of an observed correlation between the absolute value of the position error signal and the occurrence of disk-head crash. For many magnetic data storage and retrieval systems, if the absolute value of the position error signal exceeds a given value, a high likelihood of head-disk crash exists. That the absolute value of the position error signal exceeds a given value serves as a precursor to magnetic data storage and retrieval system failure.

The process next passes to step 706, which illustrates storing the absolute value of the position error signal. The position error signal will typically be stored in a data structure 600 such as that portrayed in FIG. 6. In a typical embodiment, each of several storage levels 602–606 will represent one or more testing periods, each of which will contain several data points 608–620. A typical embodiment will involve the placement of a series of data points 608–620 in one or more storage levels. In step 706, the process stores an individual absolute value of the position error signal in an individual data point. The process then passes to step 708, which depicts incrementing a counter. The process next passes to step 710, which depicts determining whether the counter has exceeded a required value. The required value represents the number of data points 608–620 that the system must store before performing the function of determining the maximum value of the position error signal. If the counter indicates that the required number of data points has not been stored, the process returns to step 702, which illustrates the detection of a position error signal indicative of the distance between an expected position of a magnetic head relative to a track centerline and an actual position of the magnetic head relative to the track centerline. Steps 704–708 are then repeated. If the counter indicates that the required number of data points 608–620 has been stored, the process then passes to step 712, which depicts determining the maximum of the absolute values of the position error signal that are stored as data points 608–620 in the data structure.

The process then passes to step 714, which depicts determining whether the maximum of the absolute values of the position error signal exceeds a threshold value. Though some non-zero maximum absolute value of the position error signal may exist at all times, the correlation between the maximum of the absolute value of the position error signal and the likelihood of a head-disk crash increases with the maximum of the absolute value of the position error signal, and the threshold value to which the determining step 714 compares the maximum of the absolute values of the position error signal represents a point at which the maximum of the absolute value of the position error signal correlates to a high likelihood of head-disk crash.

If the maximum of the absolute value of the position error signal exceeds the threshold value, the process next passes to step 716, which illustrates propagating a warning signal. This warning signal, a predictive failure analysis warning, informs the system of the likelihood of a head-disk crash. Once this signal is activated, the system can then take automatic measures to prevent data loss or can prompt the user with a predictive failure warning and instruct the user to take measures to protect the user's data. Measures that may be taken manually or automatically include performing a backup of the magnetic data storage and retrieval system in question, discontinuing access to the magnetic data storage and retrieval system and shutting down the magnetic data storage and retrieval system, or shutting down the data processing system in which the magnetic data storage and retrieval system operates. The appropriate data loss prevention measures will vary on the basis of the operational requirements and environment of the data processing system to which the magnetic data storage and retrieval system is attached. If the maximum of the absolute value of the position error signal does not exceed the threshold value, the process next passes to step 700, which depicts an initiation sequence. In some embodiments of the invention, the initiation sequence will involve waiting for the hard drive to enter its idle time function, or the process may be triggered by other system events ranging from an internal timing trigger to manual input from a user of the system.

Figure 8:
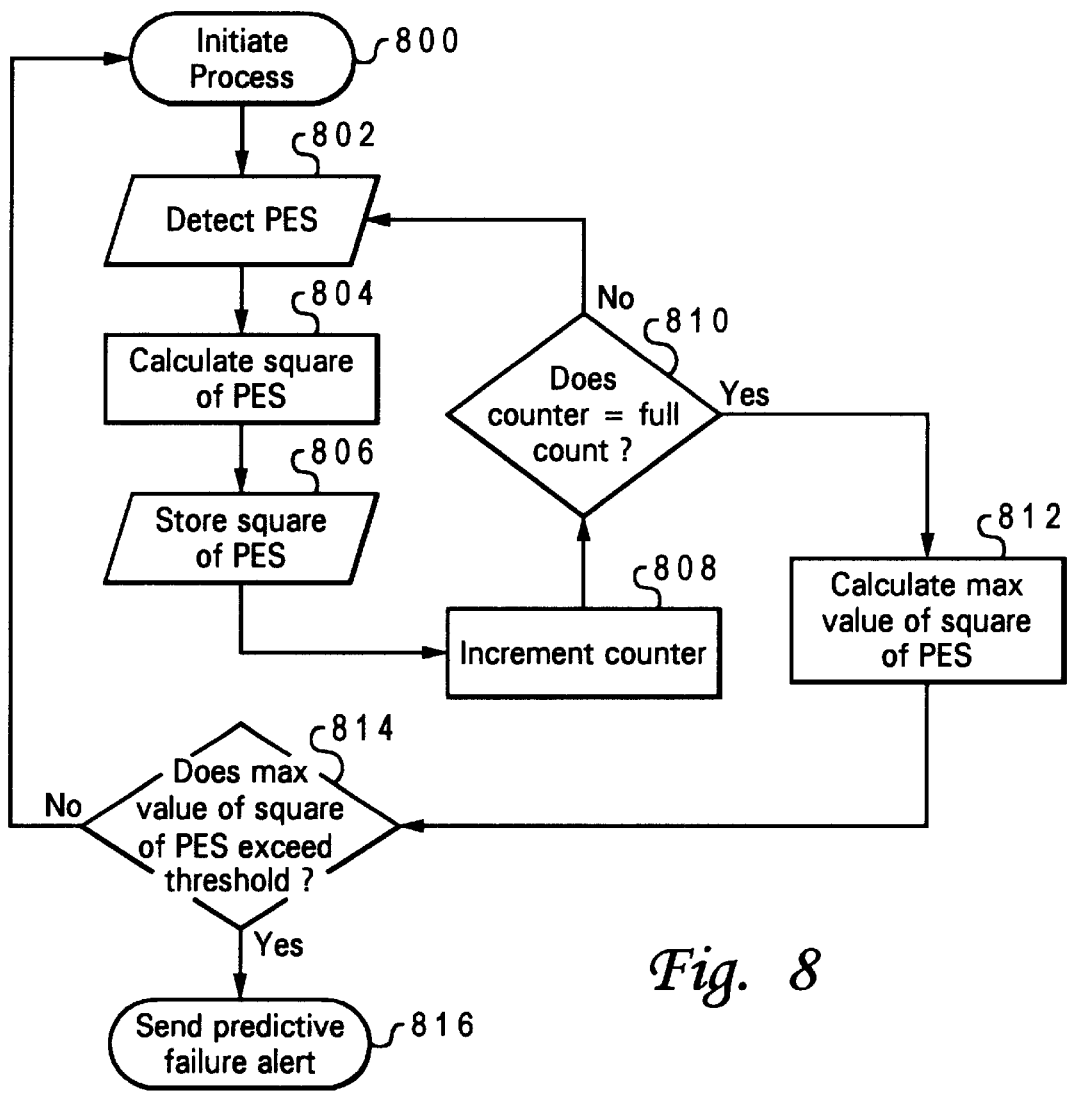
FIG. 8 is a high-level flowchart for a process of predicting and warning of an impending head-disk crash on the basis of the square of the position error signal in accordance with a second alternative embodiment of the present invention.

With reference to FIG. 8, a high-level flowchart for a process of predicting and warning of an impending head-disk crash on the basis of the square of the position error signal in accordance with a second alternative embodiment of the present invention is depicted. The process begins at step 800, which depicts an initiation sequence. In some embodiments of the invention, the initiation sequence will involve waiting for the hard drive to enter its idle time function, or the process may be triggered by other system events ranging from an internal timing trigger to manual input from a user of the system. After the process has been triggered and the initiation sequence portrayed in step 800 has run, the process then passes to step 802, which illustrates the detection of a position error signal indicative of the distance between an expected position of a magnetic head relative to a track centerline and an actual position of the magnetic head relative to the track centerline. The process next passes to step 804, which depicts determining the square of the position error signal.

This embodiment of the invention functions on the basis of an observed correlation between the square of the position error signal and the occurrence of disk-head crash. For many magnetic data storage and retrieval systems, if the square of the position error signal exceeds a given value, a high likelihood of head-disk crash exists. That the square of the position error signal exceeds a given value serves as a precursor to disk failure.

The process next passes to step 806, which illustrates storing the square of the position error signal. The position error signal will typically be stored in a data structure 600 such as that portrayed in FIG. 6. In a typical embodiment, each of several storage levels 602–606 will represent one or more testing periods, each of which will contain several data points 608–620. A typical embodiment will involve the placement of a series of data points 608–620 in one or more storage levels. In step 806, the process stores an individual square of the position error signal in an individual data point. The process then passes to step 808, which depicts incrementing a counter. The process next passes to step 810, which depicts determining whether the counter has exceeded a required value. The required value represents the number of data points 608–620 that the system must store before performing the function of determining the maximum value of the position error signal. If the counter indicates that the required number of data points has not been stored, the process returns to step 802, which illustrates the detection of a position error signal indicative of the distance between an expected position of a magnetic head relative to a track centerline and an actual position of the magnetic head relative to the track centerline. Steps 804–808 are then repeated. If the counter indicates that the required number of data points 608–620 has been stored, the process then passes to step 812, which depicts determining the maximum of the squares of the position error signal that are stored as data points 608–620 in the data structure.

The process then passes to step 814, which depicts determining whether the maximum of the squares of the position error signal exceeds a threshold value. Though some non-zero maximum square of the position error signal may exist at all times, the correlation between the maximum of the square of the position error signal and the likelihood of a head-disk crash increases with the maximum of the square of the position error signal, and the threshold value to which the determining step 814 compares the square of the position error signal represents a point at which the maximum of the square of the position error signal correlates to a high likelihood of head-disk crash.

If the maximum of the square of the position error signal exceeds the threshold value, the process next passes to step 816, which illustrates propagating a warning signal. This warning signal, a predictive failure analysis warning, informs the system of the likelihood of a head-disk crash. Once this signal is activated, the system can then take automatic measures to prevent data loss or can prompt the user with a predictive failure warning and instruct the user to take measures to protect the user's data. Measures that may be taken manually or automatically include performing a backup of the magnetic data storage and retrieval system in question, discontinuing access to the magnetic data storage and retrieval system and shutting down the magnetic data storage and retrieval system, or shutting down the data processing system in which the magnetic data storage and retrieval system operates. The appropriate data loss prevention measures will vary on the basis of the operational requirements and environment of the data processing system to which the magnetic data storage and retrieval system is attached. If the maximum of the square of the position error signal does not exceed the threshold value, the process next passes to step 800, which depicts an initiation sequence. In some embodiments of the invention, the initiation sequence will involve waiting for the hard drive to enter its idle time function, or the process may be triggered by other system events ranging from an internal timing trigger to manual input from a user of the system.

Although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of predicting head-disk crash in a magnetic data storage and retrieval system, comprising:

detecting a position error signal indicative of the distance between an expected position of a magnetic head relative to a track centerline and an actual position of the magnetic head relative to the track centerline;

determining an absolute value of the position error signal;

storing the absolute value of the position error signal;

repeating the detecting, determining, and storing steps over several revolutions of the magnetic data storage and retrieval system;

determining a maximum of the absolute values of the position error signals;

determining whether the maximum of the absolute values of the position error signals exceeds a threshold value; and responsive to determining that the maximum of the absolute values of the position error signals exceeds a threshold value, propagating a warning signal.

2. The method of claim 1, wherein the detecting step further comprises detecting the position error signal during an idle time function.

3. A method of predicting head-disk crash in a magnetic data storage and retrieval system, comprising:

detecting a position error signal indicative of the distance between an expected position of a magnetic head relative to a track centerline and an actual position of the magnetic head relative to the track centerline;

determining the square of the position error signal;

storing the square of the position error signal;

repeating the detecting, determining, and storing steps over several revolutions of the magnetic data storage and retrieval system;

determining a maximum of the squares of the position error signals;

determining whether the maximum of the squares of the position error signals exceeds a threshold value; and responsive to determining that the maximum of the squares of the position error signals exceeds a threshold value, propagating a warning signal.

4. The method of claim 3, wherein the detecting step further comprises detecting the position error signal during an idle time function.

5. An apparatus for predicting head-disk crash in a magnetic data storage and retrieval system, comprising:

means for detecting a position error signal indicative of the distance between an expected position of a magnetic head relative to a tack centerline and an actual position of the magnetic head relative to the track centerline;

means for determining an absolute value of the position error signal;

means for storing the absolute value of the position error signal;

means for repeating the detecting, determining, and storing steps over several revolutions of the magnetic data storage and retrieval system;

means for determining a maximum of the absolute values of the position error signals;

means for determining whether the maximum of the absolute values of the position error signal exceeds a threshold value; and means for, responsive to determining that the maximum of the absolute values of the position error signals exceeds a threshold value, propagating a warning signal.

6. The apparatus of claim 5, wherein the means for detecting further comprises means for detecting the position error signal during an idle time function.

7. The apparatus of claim 5, wherein the apparatus for predicting head-disk crash in a magnetic data storage and retrieval system further comprises:

an outer housing or base containing a plurality of stacked, parallel magnetic disks, which are closely spaced apart;

an actuator comprising a plurality of stacked, parallel actuator arm/suspensions in the form of a comb that is pivotally mounted to the base about a pivot assembly;

a controller, mounted to the base, for selectively moving the comb of arm/suspensions relative to disks and monitoring and providing command inputs to the actuator; and one or more magnetic read/write transducers.

8. An apparatus for predicting head-disk crash in a magnetic data storage and retrieval system, comprising:

means for detecting a position error signal amplitude indicative of the distance between an expected position of a magnetic head relative to a track centerline and an actual position of the magnetic head relative to the track centerline;

means for determining the square of the position error signal amplitude;

means for storing the square of the position error signal amplitude;

means for repeating the detecting, determining, and storing steps over several revolutions of the magnetic data storage and retrieval system;

means for determining a maximum of the squares of the position error signal amplitudes;

means for determining whether the maximum of the squares of the position error signal amplitudes exceeds a threshold value; and means for, responsive to determining that the maximum of the squares of the position error signal amplitudes exceeds a threshold value, propagating a warning signal.

9. The apparatus of claim 8, wherein the means for detecting further comprises means for detecting the position error signal amplitude during an idle time function.

10. The apparatus of claim 8, wherein the apparatus for predicting head-disk crash in a magnetic data storage and retrieval system further comprises:

an outer housing or base containing a plurality of stacked, parallel magnetic disks, which are closely spaced apart;

an actuator comprising a plurality of stacked, parallel actuator arm/suspensions in the form of a comb that is pivotally mounted to the base about a pivot assembly;

a controller, mounted to the base, for selectively moving the comb of arm/suspensions relative to disks and monitoring and providing command inputs to the actuator; and one or more magnetic read/write transducers.

11. A computer program product on a computer usable medium for predicting head-disk crash in a magnetic data storage and retrieval system, comprising:

instructions on the computer usable medium for detecting a position error signal indicative of the distance between an expected position of a magnetic head relative to a track centerline and an actual position of the magnetic head relative to the track centerline;

instructions on the computer usable medium for determining an absolute value of the position error signal;

instructions on the computer usable medium for storing the absolute value of the position error signal;

instructions on the computer usable medium for repeating the detecting, determining, and storing steps over several revolutions of the magnetic data storage and retrieval system;

instructions on the computer usable medium for determining a maximum of the absolute values of the position error signals;

instructions on the computer usable medium for determining whether the maximum of the absolute values of the position error signals exceeds a threshold value; and instructions on the computer usable medium for, responsive to determining that the maximum of the absolute values of the position error signals exceeds a threshold value, propagating a warning signal.

12. The computer program product of claim 11, wherein the instructions for detecting further comprise instructions on the computer usable medium for detecting the position error signal during an idle time function.

13. A computer program product in a computer usable medium for predicting head-disk crash in a magnetic data storage and retrieval system, comprising:

instructions on the computer usable medium for detecting a position error signal amplitude indicative of the distance between an expected position of a magnetic head relative to a track centerline and an actual position of the magnetic head relative to the track centerline;

instructions on the computer usable medium for determining the square of the position error signal amplitude;

instructions on the computer usable medium for storing the square of the position error signal amplitude;

instructions on the computer usable medium for repeating the detecting, determining, and storing steps over several revolutions of the magnetic data storage and retrieval system;

instructions on the computer usable medium for determining a maximum of the squares of the position error signal amplitudes;

instructions on the computer usable medium for determining whether the maximum of the squares of the position error signal amplitudes exceeds a threshold value; and instructions on the computer usable medium for, responsive to determining that the maximum of the squares of the position error signal amplitudes exceeds a threshold value, propagating a warning signal.

14. The computer program product of claim 13, wherein the instructions for detecting further comprise instructions on the computer usable medium for detecting the position error signal amplitude during an idle time function.

* * * * *

UNITED STATES PATENT AND TRADEMARK OFFICE
CERTIFICATE OF CORRECTION

PATENT NO.    : 6,683,737 B2
DATED         : January 27, 2004
INVENTOR(S)   : Gong et al.

It is certified that error appears in the above-identified patent and that said Letters Patent is hereby corrected as shown below:

Column 11,
Line 52, please remove the word "tack" and insert the word -- track -- between the words "a" and "centerline".

Signed and Sealed this

Eleventh Day of May, 2004

JON W. DUDAS
*Acting Director of the United States Patent and Trademark Office*